US005903683A

United States Patent [19]
Lowry

[11] Patent Number: 5,903,683
[45] Date of Patent: May 11, 1999

[54] DEVICE FOR MODULATING AN OPTICAL SIGNAL USING A SINGLE WAVE GUIDE

[75] Inventor: Curtis Wayne Lowry, Ellicott City, Md.

[73] Assignee: The United States of America as represented by the National Security Agency, Washington, D.C.

[21] Appl. No.: 08/927,410

[22] Filed: Sep. 10, 1997

[51] Int. Cl.[6] .............................. G02F 1/01; G02B 6/34; H04B 10/00
[52] U.S. Cl. .............................. 385/1; 385/37; 385/123; 385/28; 359/116; 359/130; 359/161
[58] Field of Search .............................. 385/1, 10, 3, 37, 385/123, 28, 29; 359/130, 124, 161, 173, 182, 188, 116

[56] References Cited

U.S. PATENT DOCUMENTS

| | | | |
|---|---|---|---|
| 5,093,876 | 3/1992 | Henry et al. | 385/28 |
| 5,259,048 | 11/1993 | Ozeki | 385/31 |
| 5,363,226 | 11/1994 | Strasser et al. | 359/566 |
| 5,367,582 | 11/1994 | Magel | 385/1 |
| 5,404,413 | 4/1995 | Delavaux et al. | 385/15 |
| 5,434,702 | 7/1995 | Byron | 359/341 |
| 5,459,801 | 10/1995 | Snitzer | 385/30 |
| 5,613,028 | 3/1997 | Antos et al. | 385/123 |
| 5,699,468 | 12/1997 | Farries et al. | 385/37 |
| 5,832,148 | 11/1998 | Yariv | 385/37 |

OTHER PUBLICATIONS

Craig D. Poole et al., "Optical Fiber–Based Dispersion Compensation Using Higher Order Modes Near Cutoff," IEEE Journal of Lightwave Technology, vol. 12, No. 10, Oct. 1994.
A Compact Device for Highly Efficient Dispersion Compensation in Fiber Transmission, Peschel et al., Oct. 9, 1995, Appl. Phys. Lett. 67(15) pp. 2111–2113.
Fundamentals of Optical Fibers, John A. Buck Wiley–Interscience, 1995, New York, New York.
New Diffraction Grating Pair with Very Linear Dispersion for Laser Pulse Compression Tournois, Electronics Letters, Aug. 5, 1993, vol. 29, No. 16 pp. 1414–1415.
Grating compensation of Third–Order Fiber Dispersion Stern et al., IEEE Journal of Quantum Elect., vol. 28, No. 12, Dec. 1992, pp. 2742–2748.
Dispersion Cancellation Using Linearly Chirped Bragg Grating Filters in Optical Waveguides Quellette, Optics Letters, Oct. 1987, vol. 12, No. 10, pp. 847–849.
Waveguide Grating Filters for Dispersion Compensation and Pulse Compression Roman et al., IEEE J. of Quantum Elec., vol. 29, No. 3, Mar. 1993, pp. 975–982.
Mode–Coupling Characteristics of UV–written Bragg Gratings in Depressed–Cladding Fibre Morey et al., Electronics Lett. Apr. 28, 1994, vol. 30, No. 9, pp. 730–732.
Long–Period Fiber Gratings as Band–Retection Filters Vengsarkar et al., J. of Lightwave Tech., vol. 14, No. 1, Jan. 1996, pp. 58–65.
Efficient Mode Conversion in Telecommunication Fibre using Externally Written Gratings Hill et al., Elect. Lett., Aug. 2, 1990, vol. 26, No. 16, pp. 1270–1272.

(List continued on next page.)

*Primary Examiner*—Hemang Sanghavi
*Attorney, Agent, or Firm*—Robert D. Morelli

[57] ABSTRACT

The present invention is a device for adding delay and compensating for dispersion in an optical signal. In a first embodiment, the present invention is made up of a waveguide, preferably an optical fiber, having two or more forward-reflecting gratings for separating an optical signal into user-selected wavelength portions to be propagated in different propagation modes and then recombining them to achieve the desired result. In another embodiment, the present invention is a waveguide, preferably an optical fiber, having three or more gratings where the gratings may be forward-diffracting or backward-reflecting for extending the capability of the first embodiment.

6 Claims, 3 Drawing Sheets

OTHER PUBLICATIONS

Chirped in–Fiber Bragg Gratings for Compensation of Optical–Fiber Dispersion Hill et al., Otpis Lett., vol. 19, No. 17, Sep. 1, 1994, pp. 1314–1316.

Hill et al. Otpics Lett., vol. 19, No. 17, Sep. 1, 1994, pp. 1314–1316 Fiber Gratings as Demultiplexing Filters for WDMA Networks.

Fiber Gratings as Demultiplexing Filters for WDMA Networks Pastor et al., IEE, 1995, London, pp. 13/1–13/6.

DEVICE FOR MODULATING AN OPTICAL SIGNAL USING A SINGLE WAVE GUIDE

FIELD OF THE INVENTION

The present invention relates to optics and, more particularly, to an optical element for modulating an optical signal using a single inexpensive waveguide for introducing delay and compensating for dispersion.

BACKGROUND OF THE INVENTION

Optics is the science of light transmission through media. One of the most important examples of optics is the transmission of light through a waveguide which may be made from different materials such as glass, plastic, semiconductor material, or other light transparent material. Some of these materials may be made into fibers called optical fibers. An optical fiber is one type of waveguide.

Modulated light, such as a short optical pulse, is made up of different wavelengths of light. These different wavelengths may be affected differently by the medium through which the light passes. Dispersion is the process by which radiation (e.g., light) is separated in accordance with some characteristic (e.g., wavelength, polarization, etc.) into components which have different propagating characteristics. For example, an optical signal may be composed of three different wavelengths of light (e.g., A, B, and C). At any point in time, the order of these waveforms may be ABC. The medium through which the optical signal travels may cause the three waveforms to travel at different speeds and, therefore, cause the ordering of its components to be different when seen by a receiver. For example, a signal with the original waveform order ABC may be changed by the medium through which the signal travels to a signal of waveform order BAC by the time the signal reaches the receiver. For example, dispersion may cause a short optical pulse, composed of simultaneously launched wavelength components, to spread into a longer pulse because the components travel at different speeds and, therefore, arrive at the destination at different times. Such pulse spreading can be very harmful to the operation of optical systems (e.g., optical communications, high-speed switching, etc.). To reverse this process, dispersion compensation may be accomplished by properly delaying each component of the optical signal in order to restore the desired temporal alignment.

An optical fiber is a transparent, dielectric cylinder surrounded by a second transparent dielectric cylinder. The fiber is one type of waveguide used to transmit energy at optical wavelengths. The light travels along the length of the fiber and is kept within the fiber by a series of grazing-angle reflections from wall to wall of an interface between the inner dielectric cylinder (i.e., the core) and the outer dielectric cylinder (i.e., the cladding). The reflections are made possible by a high refractive index of the core and a lower refractive index of the cladding. As the light travels along the fiber, the differences in the refractive indices cause the light wave to bounce from the core/cladding interface on one side of the optical fiber back through the core to the opposite core/cladding interface. The core/cladding interface acts as a mirror to reflect without power loss and keep the light in the channel determined by the core.

There are two classes of optical fiber (i.e., single mode fiber and multi-mode fiber). A single mode fiber has a much smaller core than does a multi-mode fiber. With a wider core, a multi-mode fiber may transmits signals having a wider angle of incidence with respect to the axis of the fiber than does a single-mode fiber. Signals of different angles of incidence travel along the fiber with different angles of reflection and are said to be of different modes. Having a smaller core, a single-mode fiber only transmits optical signals that have an angle of incidence with respect to the fiber in a narrow range (effectively parallel with the core). Therefore, a single-mode fiber is thought of as accepting optical signals having a single angle of incidence with respect to the fiber (i.e., a single mode) while a multi-mode fiber transmits optical signals having many different angles of incidence with respect to the fiber (i.e., multiple modes). The speed with which an optical signal travels along an optical fiber depends on the signal's angle of incidence with respect to the fiber. For example, an optical signal that has an angle of incidence with respect to the fiber of zero degrees (i.e., parallel to the core) will take the least time to travel a distance along the fiber because the path through the fiber is the shortest (i.e., straight through). An optical signal having the greatest allowable angle of incidence with respect to the fiber will take the longest time to travel along the same length of fiber because the signal bounces back and forth from cladding interface to cladding interface, as it travels. Such a path is the longest path possible through the fiber and, therefore, takes the longest time to travel the length of the fiber.

The various modes of propagation that a light wave may take through an optical fiber may be designated by "$LP_{1m}$," where "LP" stands for linearly polarized, where "1" is one-half the number of minima (or maxima) that occur around the circumference of the core in an intensity pattern of the particular light wave in question, and where "m" is the number of maxima in the intensity pattern that occur along a radial line between the core center and the outer surface of the fiber. A light wave may be transmitted in any one of a number of modes, where each mode is linearly polarized in one direction.

Various devices may be used to modulate a signal. Some of these devices include the term "chirp." A chirped grating is one where the spacing between each grating structure varies from structure to structure in some smooth fashion. Dispersion may be added to an optical signal by applying the signal to a chirped grating.

A prior art method of imposing time delay is to switch light into selectable fiber, or non-fiber waveguide, delay loops. The disadvantage of this approach is that the selection of delay is, necessarily, discrete (i.e., light is sent to a selected loop or not), and the method is not useful for imposing a gradiently changing delay (e.g., for dispersion compensation in an input with a broad, continuous spectrum). Dispersion compensation has been done by passing the signal through a medium with an opposing dispersion. For example, a length of dispersion compensating fiber (DCF) is spliced into a transmission fiber so that the optical dispersion of the DCF is of opposite sign to the optical dispersion of the transmission fiber. The disadvantage of this approach is that the obtainable delay functions are limited to those possible with dispersion compensating fiber, or non-fiber waveguide, and are either monotonically increasing or decreasing rather than user-definable. These ideas are disclosed in the following articles and patents: 1) "A compact device for highly efficient dispersion in fiber transmission," by Peschel et al., published in "Appl. Phys. Lett." 67 (15), Oct. 9, 1995, pp. 2111–2113; 2) U.S. Pat. No. 5,259,048, entitled "OPTICAL EQUALIZER"; and 3) U.S. Pat. No. 5,367,582, entitled "VERTTCALLY-COUPLED ARROW MODULATORS OR SWITCHES ON SILICON." U.S. Pat. Nos. 5,259,048 and 5,367,582 are hereby incorporated by reference into the specification of the present invention. These prior art articles and patents do not disclose the use of multiple gratings in a single fiber or non-fiber waveguide as does the present invention. Also, these prior art articles require the use of at least one additional fiber or non-fiber waveguide coupled to the original fiber or waveguide, while the present invention does not.

Another prior art method of adding delay or doing dispersion compensation is to transmit a signal over a fiber (or non-fiber waveguide), reflect the signal off of a first discrete grating element situated in free space for introducing delay or negative group velocity dispersion, and further reflecting the reflected signal off of a second discrete grating element situated in free space. The second reflection of the signal is delayed or compensated as desired. The drawbacks to this approach include 1) requiring at least three discrete elements, 2) having two of these elements located in free space which may be difficult to control, 3) inducing large signal power loss through grating diffraction inefficiency as well as coupling between the fiber or other waveguide and free-space, and 4) the available dispersion functions are limited to monotonically increasing or decreasing delay rather than user definable as in the present invention. This approach has been disclosed in the following book, articles, and patent: 1) "Fundamentals of optical fibers," by Buck, pp. 227–228, 1995, John Wiley & Sons, New York, N.Y.; 2) "New Diffraction Grating Pair With Very Linear Dispersion For Laser Pulse Compression," by Tournois, published in "Electronics Letters," Aug. 5, 1993, Vol. 29, No. 16, pp. 1414–1415; 3) "Grating Compensation of Third-Order Fiber Dispersion," by Stern et al., published in "IEEE Journal of Quantum Electronics," Vol. 28, No. 12, December 1992, pp. 2742–2748; 4) U.S. Pat. No. 5,363,226, entitled "APPARATUS AND METHOD FOR DISPERSION COMPENSATION FOR A GRATING COUPLER USING A SURFACE RELIEF REFLECTION GRATING." U.S. Pat. No. 5,363, 226 is hereby incorporated by reference into the specification of the present invention. These prior art articles, book, and patent do not disclose the use of multiple gratings in a single fiber, or nonfiber waveguide, as does the present invention.

Prior art articles disclose the use of a single, chirped grating in a waveguide for dispersion compensation. These articles include: 1) "Dispersion cancellation using linearly chirped Bragg grating filters in optical waveguides," by Ouellette, published in "Optics Letters," Vol. 12, No. 10, October 1987, pp. 847–849; and 2) "Waveguide Grating Filters for Dispersion Compensation and Pulse Compression," by Roman et al., published in "IEEE Journal of Quantum Electronics," Vol. 29, No. 3, March 1993, pp. 975–982. These articles do not disclose the device of the present invention. Additionally, these articles disclose, ultimately, sending the compensated signal backward in the fiber toward the source, while the present invention does not.

The use of a single grating to transfer the signal from one fiber mode to another is disclosed in the prior art in the following articles: 1) "Mode-coupling characteristics of UV-written Bragg gratings in depressed-cladding fibre," by Morey et al., published in "Electronics Letters," Apr. 28, 1994, Vol. 30, No. 9, pp. 730–732; 2) "Long-Period Fiber Gratings as Band-Rejection Filters," by Vengsarkar et al., published in "Journal of Lightwave Technology, Vol. 14, No. 1, January 1996, pp.58–65; and 3) "Efficient Mode Conversion In Telecommunication Fibre Using Externally Written Gratings," by Hill et al., published in "Electronics Letters," Aug. 2, 1990, Vol. 26, No. 16, pp. 1270–1272. These prior art articles do not disclose the device of the present invention.

Other prior art articles and patents disclose the use of multiple gratings but with additional, and sometimes expensive, components (e.g., a circulator) not required by the present invention or use the multiple gratings for devices that do not add delay or compensate for dispersion using a single fiber, or non-fiber waveguide, as does the present invention. These articles and patents include: 1) "Chirped in-fiber Bragg gratings for compensation of optical-fiber dispersion," by Hill et al., published in "Optics letters," Vol. 19, No. 17, Sep. 1, 1994, pp. 1314–1316; 2) "Fiber Gratings As Demultiplexing Filters For WDMA Networks," by Pastor et al., published by The Institution of Electrical Engineers, 1995, pp. 13/1–13/6; 3) U.S. Pat. No. 5,404,413, entitled "OPTICAL CIRCULATOR FOR DISPERSION COMPENSATION"; 4) U.S. Pat. No. 5,434,702, entitled "OPTICAL REPEATERS"; and 5) U.S. Pat. No. 5,093,876, entitled "WDM SYSTEMS INCORPORATING ADIABATIC REFLECTION FILTERS." U.S. Pat. Nos. 5,404, 413; 5,434,702; and 5,093,876 are hereby incorporated by reference into the specification of the present invention.

U.S. Pat. No. 5,613,028, entitled "CONTROL OF DISPERSION IN AN OPTICAL WAVEGUIDE," discloses a device for and method of compensating for dispersion by keeping the signal in a single propagating mode, constructing the waveguide having alternating sections of positive mode dispersion and negative mode dispersion. The present invention discloses a device for compensating for dispersion that does not keep the signal in a single propagating mode and does not employ a waveguide having alternating sections of positive mode dispersion and negative mode dispersion. U.S. Pat. No. 5,613,028 is hereby incorporated by reference into the specification of the present invention.

SUMMARY OF THE INVENTION

It is an object of the present invention to modulate an optical signal using a single waveguide.

It is another object of the present invention to modulate an optical signal using a single waveguide in order to compensate for, or impose additional, dispersion on the signal.

It is another object of the present invention to modulate an optical signal using a single waveguide in order to add a user-definable amount of delay to the signal.

It is another object of the present invention to modulate an optical signal using a plurality of forward-diffracting gratings in an optical fiber so that parts of the signal are propagated in different forward-traveling modes and then converted back into the original propagating mode and recombined.

It is another object of the present invention to modulate an optical signal using a plurality of diffractive gratings, both backward-reflecting and forward-diffracting, in a single optical fiber so that parts of the signal are propagated in different modes and then converted back into the original propagating mode and recombined.

It is another object of the present invention to modulate an optical signal in an inexpensive manner that does not require any components other than a single waveguide that includes a plurality of diffractive gratings.

The objects of the present invention are achieved in a first embodiment that is made up of a single waveguide, preferably a multi-mode optical-fiber, with two sets of forward-diffracting gratings contained therein. Each set of gratings may be defined by the user to select certain wavelengths of the optical signal to either pass unaltered through the grating or to be diffracted into a different propagating mode. Light propagated at different modes have different group velocity and dispersion which may be used to either add delay (positive or negative) or compensate for dispersion.

The present invention is useful for adding delay and compensating for dispersion without requiring the use of spliced fiber sections, external optical gratings, prisms, beam splitters, circulators, and such. Without any additional components, which each cause some optical loss, the present invention may operate, theoretically, without any optical loss.

Each diffractive gratings is made up of multiple user-specified structures in the waveguide having indices of refraction or optical absorption that differ from the index of the surrounding waveguide material (e.g., etched structures or structures with a different material composition). The structures are defined to work in concert to diffract light from one direction of propagation into another. Each grating may convert user-specified fractions of available light at user-specified wavelengths into a different user-specified propagating mode, and pass the balance of the light unaltered. The wavelength selected for conversion, the portion of light converted, and the new propagating mode are each user-defined. The gratings may be formed in the waveguide at the time of manufacture or anytime thereafter. The new propagating modes may be either forward-propagating or backward-propagating. The user adds delay by combining the transfer of light into new modes, the propagation of light in waveguide modes, and the transfer of light back into the original mode, in order to make the optical path length longer. The user compensates for dispersion by using wavelength-dependent selection of delay to rearrange the order of the wavelength components in the signal.

The first embodiment operates by allowing light to enter the fiber in a first forward propagating mode (e.g., mode 1). Upon encountering each grating in a first set of gratings, a user-defined number of wavelength components of the signal pass through the grating unaltered (e.g., mode 1) while a user-defined number of wavelength components of the signal are converted into different forward propagating modes (e.g., mode 2). Light propagating in different modes propagates with different group velocities and dispersions. Upon encountering each grating in the second set of user-defined gratings, any light propagating in the first forward propagating mode (e.g., mode 1) is passed unaltered through the second set of gratings while any light propagating in a mode (e.g., mode 2) that is different from the first forward-propagating mode (e.g., mode 1) is converted back into the first forward-propagating mode (e.g., mode 1) and is recombined with the signal that passed unaltered through the two gratings into one forward-propagating signal. The resulting signal is either delayed or dispersion compensated depending on the grating selections made by the user.

In a second embodiment, additional forward-propagating gratings are added to the first embodiment in order to split and recombine the signal in more diverse ways. Each grating may convert only a user-defined portion of the available light at each wavelength to a userdefined forward propagating mode while allowing the balance of the light to pass unaltered. In the second embodiment, there are three sets of forward-propagating gratings, but any number of gratings may be included by the user. The first set of gratings acts as did the first set of gratings in the first embodiment (e.g., propagating signals of mode 1 and mode 2). The second grating further splits or combines the propagating modes into either more or fewer propagating modes (e.g., propagating signals of mode 1, mode 2, and mode 3). The third grating converts the propagating modes that are different from the initial propagating mode back into the initial propagating mode so that the different propagating modes, albeit with different delay and dispersion, may be recombined into a single forward-propagating signal. The resulting signal is either delayed or dispersion compensated as determined by the grating selections made by the user. By adding more gratings, an unlimited number of delay and dispersion compensation functions may be achieved.

In a third embodiment, both forward-diffracting and backward-reflecting gratings are used. With this embodiment, the greatest amount of delay or dispersion compensation may be achieved. The third embodiment is made up of a single waveguide, preferably a multi-mode optical-fiber, with three sets of gratings (i.e., a forward-reflecting grating followed by a backward-reflecting grating followed by a forward-diffracting grating). As in the other embodiments, the number and type of gratings may be specified by the user to achieve any number of delay and dispersion compensation functions.

The third embodiment operates by allowing light to enter the fiber at a first forward propagating mode (e.g., mode 1). Upon encountering the first set of gratings (i.e., a set of forward-reflecting gratings), the signal is passed unaltered. Upon encountering the second set of gratings (i.e., a first set of backward-reflecting gratings) a user-defined number of wavelength components of the signal pass through the second grating unaltered (e.g., mode 1) while a user-defined number of wavelength components of the signal are converted to different backward-propagating modes (e.g., mode 2). Light propagating in different modes propagate at different group velocity and dispersion, and light reflected backwards and then turned forwards encounters a longer path length than if it was allowed to propagate forward without alteration. Therefore, the maximum amount of delay may be added by using backward-reflecting gratings. The forward propagating mode (e.g., mode 1) continues forward in the fiber while the backward propagating mode (e.g., mode 2) continues backward in the fiber. The backward propagating mode (e.g., mode 2) eventually encounters the first set of gratings. Since the first set of gratings is forward-reflecting, the backward propagating signal is reflected forward once again, albeit with the additional delay of the backward propagating path. The first set of gratings also has the opportunity to split the backward propagating signal into a number of forward propagating modes (e.g., mode 2 and mode 3). Eventually, the forward propagating signals (e.g., mode 1, 2, and 3) encounter the third set of gratings (i.e., forward-propagating) but at different times because the backward propagating signal had a longer way to go. Any light propagating in the first forward propagating mode (e.g., mode 1) is passed unaltered through the third grating while any light propagating in a different mode (e.g., mode 2 and mode 3), with a different group velocity and dispersion from the first forward propagating mode, is converted back into the first forward propagating mode (e.g., mode 1) and is recombined with the signal that passed unaltered through the three gratings into one forward propagating signal. The resulting signal is either delayed or dispersion compensated depending on the grating selections made by the user.

A fourth embodiment is possible that includes any number of each type of grating disclosed in the third embodiment above to achieve any desired delay, or dispersion compensation, function desired by the user.

DETAILED DESCRIPTION

The present invention is a device for modulating an optical signal using a single waveguide in order to add delay to an optical signal or compensate for dispersion in a manner that does not require additional, and sometimes expensive, components.

Figure 1:
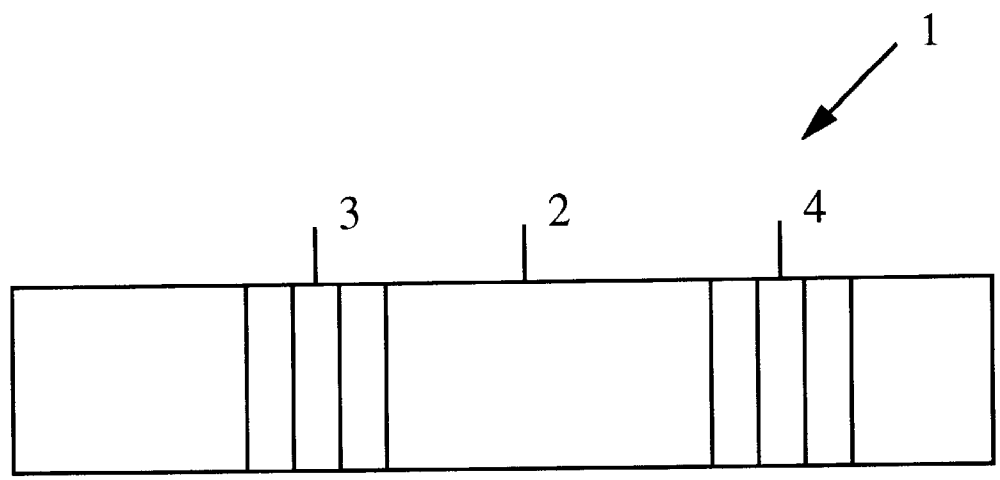
FIG. 1 is a top view of an optical fiber that includes two forward-diffracting gratings.

FIG. 1 is a top view of the first embodiment 1 of the present invention. The first embodiment 1 is made up of a single waveguide 2, preferably a multi-mode optical-fiber, a first set of forward-diffracting gratings 3 formed in the waveguide 2, and a second set of forward-diffracting gratings 4 formed in the waveguide 2. Each set of gratings 3,4 may be defined by the user to select certain wavelengths of the optical signal to either pass unaltered through the grating or to be diffracted into a different propagating mode. Light propagated at different modes have different group velocity and dispersion which may be used to either add delay (positive or negative) or compensate for dispersion.

The present invention is useful for adding delay and compensating for dispersion without requiring the use of spliced fiber sections, external optical gratings, prisms, beam splitters, circulators, and such. Without any additional components, which each cause some optical loss, the present invention may operate, theoretically, without any optical loss.

Each set of gratings 3,4 is made of multiple user-specified structures formed in the waveguide which act in concert to diffract user-specified portions of light at user-specified wavelengths from one propagating mode into another and may pass user-specified wavelengths of the signal unaltered. The gratings may be formed in the waveguide at the time of manufacture or anytime thereafter. The propagating modes may be either forward-propagating or backward-propagating. The user adds delay by combining the transfer of light into new modes, the propagation of light in waveguide modes, and the transfer of light back into the original mode, in order to make the total optical path length longer. The user compensates for dispersion by using wavelength-dependent selection of delay to rearrange the order of the wavelength components in the signal.

Figure 2:
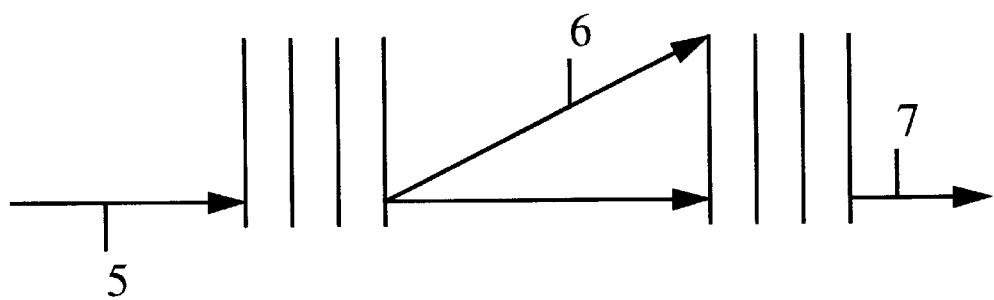
FIG. 2 is an illustration of the operation of the device of FIG. 1.

FIG. 2 is an illustration of the operation of the first embodiment 1 of the present invention as depicted in FIG. 1. Light 5 enters the fiber 2 in FIG. 1 at a first forward propagating mode (e.g., mode 1). Upon encountering the first set of gratings 3 in FIG. 1, a user-defined number of wavelength components of the signal pass through the first grating 3 unaltered (e.g., mode 1) while a user-defined number of wavelength components of the signal are converted into different forward propagating modes 6 (e.g., mode 2). Light propagating in different modes propagate at different group velocity and dispersion. Upon encountering the second set of user-defined gratings 4 in FIG. 1, any light propagating in the first forward propagating mode 5 (e.g., mode 1) is passed unaltered through the second grating 4 in FIG. 1 while any light propagating in a different mode 6 (e.g., mode 2) from the first forward propagating mode 5 (e.g., mode 1) is converted back into the first forward-propagating mode 5 (e.g., mode 1) and is recombined with the signal that passed unaltered through the two gratings 3,4 in FIG. 1 into one forward-propagating signal 7 in the same mode (e.g., mode 1) as the light entering the present invention 1 in FIG. 1. The resulting signal 7 is either delayed or dispersion compensated depending on the grating selections made by the user.

Figure 3:
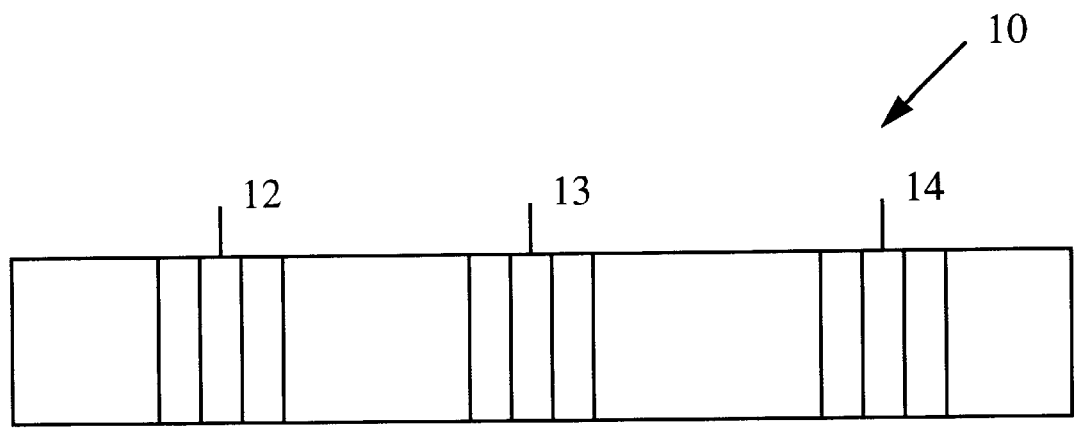
FIG. 3 is a top view of an optical fiber that includes three forward-diffracting gratings.

FIG. 3 is a top view of a second embodiment 10 of the present invention. The second embodiment 10 includes a waveguide 11, preferably an optical-fiber, that has etched therein a first forward-propagating grating 12, a second forward-propagating grating 13, and a third forward-propagating grating 14. The additional forward-propagating gratings are added in order to allow the user to fashion more complex functions for adding delay and compensating for dispersion. Note that the user may include any number of gratings in order to achieve the delay or dispersion compensation function desired.

Figure 4:
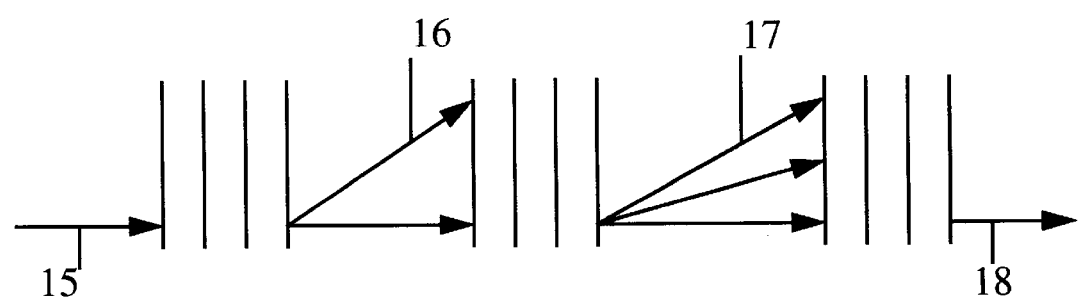
FIG. 4 is an illustration of the operation of the device of FIG. 3.

FIG. 4 is an illustration of how the second embodiment of FIG. 3 works. The first grating 12 acts as did the first set of gratings 3 in FIG. 1. That is, receiving the incoming light 15 (e.g., mode 1) and passing a portion of it according to the user and converting a portion of it according to the user into a different mode 16 (e.g., mode 2). The second grating 13 passes a portion of the incoming modes 15, 16 (e.g., mode 1 and mode 2) according to the user and further splits or combines the propagating modes into either more or less propagating modes 17 (e.g., mode 3). The third grating 14 converts the propagating modes 16, 17 (e.g., mode 2 and mode 3) that are different from the initial propagating mode 15 (eg., mode 1) back into the initial propagating mode 15 (e.g., mode 1) so that the different propagating modes 15, 16, 17 (e.g., mode 1, mode 2, and mode 3), albeit with different delay and dispersion, may be recombined into a single forward-propagating signal 18 in the mode of the original incoming signal (e.g., mode 1). The resulting signal 18 is either delayed or dispersion compensated as determined by the grating selections made by the user. Note that each grating used to convert light at a user-specified wavelength from one mode to another may be designed to only convert a user-defined portion of the available light and leave the balance of that light unaltered. By adding more gratings, an unlimited number of delay and dispersion compensation functions may be achieved.

Figure 5:
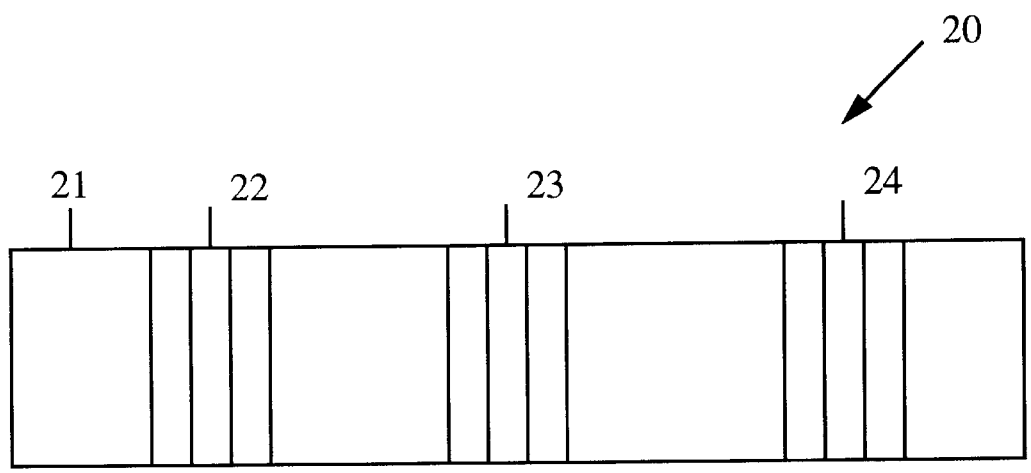
FIG. 5 is a top view of an optical fiber that includes a forward-reflecting grating, a back-reflecting grating, and a forward-diffracting grating.

FIG. 5 is a top view of a third embodiment 20 of the present invention. The third embodiment 20 is made up of a single waveguide 21, preferably a multi-mode optical-fiber, that includes a forward-reflecting grating 22, a backward-reflecting grating 23, and a forward-diffracting grating 24. With this embodiment, the greatest amount of delay or dispersion compensation may be achieved. As in the first embodiment 1 of FIG. 1 and the second embodiment 10 of FIG. 3, the number and type of gratings may be specified by the user to achieve any number of delay and dispersion compensation functions.

Figure 6:
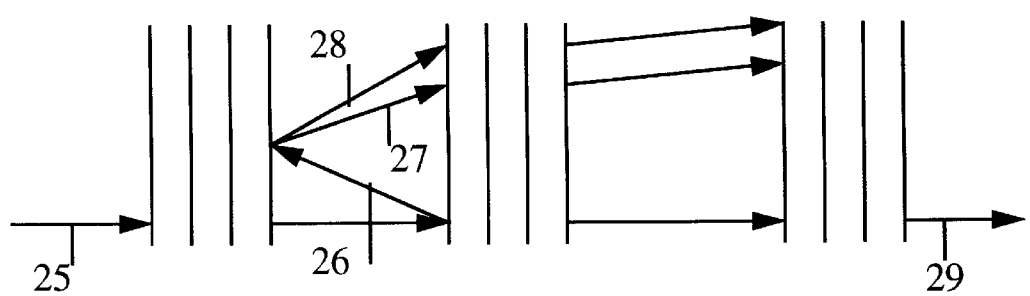
FIG. 6 is an illustration of the operation of the device of FIG. 5.

FIG. 6 is an illustration of the operation of the third embodiment 20 of FIG. 5. Light 25 in an initial propagating mode (e.g., mode 1) enters the optical fiber 21 of FIG. 5. Upon encountering the first forward-reflecting grating 22 in FIG. 5, the light 25 is passed unaltered. Upon encountering the backward-reflecting grating 23 in FIG. 5, a number of user-defined wavelength components of the light 25 is passed unaltered while a user-defined number of wavelength components of the light 25 is back-reflected in one or more different modes 26 (e.g., mode 2) from the mode of the incoming light 25 (e.g., mode 1). Light propagating in different modes propagate at different group velocity and dispersion, and light propagating backwards encounters a longer path length than if it was allowed to continue forward. Therefore, the maximum amount of delay may be added by using backward-reflecting gratings. The forward-propagating portion of the light 25 (e.g., mode 1) continues forward in the fiber 21 while the backward-propagating modes 26 (e.g., mode 2) continue backward in the fiber 21. The backward-propagating modes 26 (e.g., mode 2) eventually encounter the first set of forward-reflecting gratings 22 in FIG. 5. The backward propagating signal 26 (e.g., mode 2) is reflected forward once again, albeit with the additional delay of the backward propagating path. The first set of forward-reflecting gratings 22 also has the opportunity to split the backward propagating signal into a number of forward propagating modes 27, 28 (eg., mode 2 and mode 3). Eventually, the forward propagating signals 25, 27, 28 (e.g., mode 1, mode 2, and mode 3) encounter the set of forward-diffracting gratings 24 in FIG. 5 but at different times because the backward propagating signal 26 had a longer way to go. Light propagating in the first forward propagating mode 25 (e.g., mode 1) is passed unaltered through the second forward-reflecting grating 24 while any light propagating in a different mode 27, 28 (e.g., mode 2 and mode 3), with a different group velocity and dispersion from the first forward propagating mode, is converted back into the first forward propagating mode (e.g., mode 1) and is recombined with the first propagating mode 25 (eg., mode 1) that passed unaltered through the three gratings 22, 23, 24 into one forward propagating signal 29. The resulting signal 29 is either delayed or dispersion compensated depending on the grating selections made by the user.

The third embodiment described above may be improved upon, as the first embodiment was improved upon in the second embodiment, by including any number of gratings contained therein in order to allow the user to define a wide range of more complicated delay, or dispersion compensation, functions.

What is claimed is:

1. A device for modulating an optical signal, comprising:
    a) a waveguide, further including:
        i) a backward-reflecting grating for passing unaltered a user-defined number of wavelength components of the optical signal in a first propagating mode and converting a user-defined number of wavelength components of the optical signal into at least one backward propagating signal of a different propagating mode, where a user-defined portion of the optical signal is converted to the different propagating mode; and
        ii) a forward-reflecting grating for converting the backward propagating signal into a user-defined number of wavelength components of the optical signal into at least one forward propagating signal having a propagating mode selected from the group consisting of the same propagating mode as the backward propagating signal and a different propagating mode from the backward propagating signal, where a user-defined portion of the optical signal is converted to the different propagating mode; and
        iii) a forward-diffracting grating for converting a user-defined portion of at least one forward propagating signal into the first propagating mode so that it is combined in the waveguide with the unaltered user-defined number of wavelength components of the optical signal in order to modulate the optical signal.

2. The device of claim 1, where said waveguide is an optical fiber.

3. The device of claim 1, further including at least one forward-reflecting grating.

4. The device of claim 1, further including at least one backward-reflecting grating.

5. The device of claim 2, further including at least one forward-reflecting grating.

6. The device of claim 5, further including at least one backward-reflecting grating.

* * * * *